Aug. 2, 1966 W. M. KAUFMAN ETAL 3,264,566

ELECTRONIC SWITCHING OF TUNED CIRCUITS

Filed July 13, 1962 3 Sheets-Sheet 1

INVENTORS.
WILLIAM M. KAUFMAN
LAWRENCE R. HILL
FRANK S. STEIN

BY James and Franklin

ATTORNEYS

ELECTRONIC SWITCHING OF TUNED CIRCUITS

Filed July 13, 1962 3 Sheets-Sheet 2

INVENTORS.
WILLIAM M. KAUFMAN
LAWRENCE R. HILL
FRANK S. STEIN

BY James and Franklin

ATTORNEYS

Aug. 2, 1966 W. M. KAUFMAN ETAL 3,264,566

ELECTRONIC SWITCHING OF TUNED CIRCUITS

Filed July 13, 1962 3 Sheets-Sheet 3

INVENTORS.
WILLIAM M. KAUFMAN
LAWRENCE R. HILL
FRANK S. STEIN

BY James and Franklin
ATTORNEYS

United States Patent Office 3,264,566

Patented August 2, 1966

3,264,566

ELECTRONIC SWITCHING OF TUNED CIRCUITS

William M. Kaufman, Westfield, Lawrence R. Hill, Millburn, and Frank S. Stein, West Orange, N.J., assignors to General Instrument Corporation, Newark, N.J., a corporation of New Jersey Filed July 13, 1962, Ser. No. 209,654

5 Claims. (Cl. 325—465)

This invention relates to the switching of tuned circuits, and more particularly the circuits of a television receiver for channel selection.

In apparatus where radio frequency signals are present in a moderate number of discrete fixed frequencies, typically a commercial television receiver for channel selection, the present technique is to mechanically switch the coils of the tuned circuits in the "front end" of the receiver. The mechanical switching of radio frequency coils introduces difficulties, such as contact noise in the radio frequency signal, and contact barrier film which becomes significant when dealing with weak signals which may be of the order of millivolts or even microvolts.

Another difficulty is the cost of construction and assembly of such tuners because of the need to mount the banks of tuning coils directly on the ganged switch wafers, and the need for manual adjustment or "trimming" of the individual coils.

The primary object of the present invention is to overcome the foregoing difficulties, which is done, generally, by electronically switching the coils, without using mechanical switch elements in the radio frequency circuits. In simplest form a mechanical switch may be retained, but what it switches is a local D.C. bias voltage of substantial amount, rather than the weak incoming radio frequency signal. More specifically, solid state diodes are used as radio frequency switches, and these diode switches are in effect "closed" when they are "forward biased," and they are "open" when they are "reverse biased."

A further object of the invention is to provide electronic switching circuitry in another form in which the selection or switching action is obtained by continuous variation of a bias voltage, instead of by step-by-step switching from one diode to another.

Still another object is to provide circuitry in which the invention is practised in still another form, with the control being wholly electronic, even in respect to the switching of the bias applied to the diodes, and which form is particularly good for remote control purposes.

Still another object is to apply "thin film circuitry" techniques to the invention.

To accomplish the foregoing general objects, and other more specific objects which will hereinafter appear, our invention resides in the electronic switching means, and the elements thereof and their relation one to another, as are hereinafter more particularly described in the following specification. The specification is accompanied by drawings in which.

Figures 1, 2:
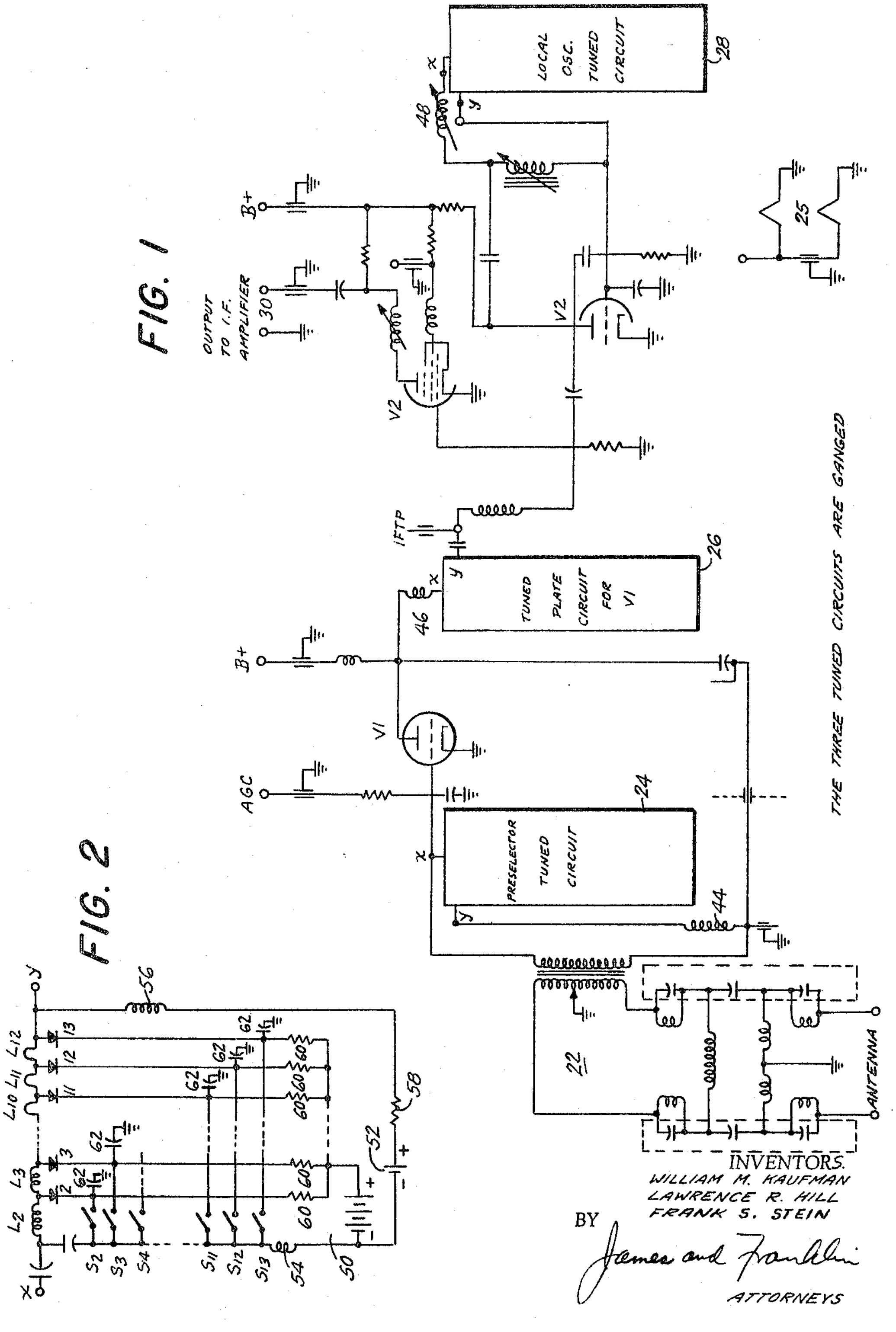
FIG. 1 is a wiring diagram for the "front end" or tuner section of a television receiver.
FIG. 2 is a wiring diagram showing the content of the boxes used in FIG. 1.

Referring to the drawings, and more particularly to FIG. 1, the television tuner there shown comprises a section designated 22, the purpose of which is to couple the tuner to the antenna transmission line, the latter being connected at the terminals marked "Antenna" at the lower left of the drawing. The coupling provides trap coils as well as impedance matching. As is customary in current television receivers, the tuner has three tuned circuits which are ganged together for simultaneous control by a single knob. The coils and switching means for the circuits are indicated by the rectangles 24, 26, and 28. The tuned circuit at 24 precedes the first vacuum tube and provides a preselection. The tube V1 is a radio frequency amplifier tube, and the second tuned circuit at 26 acts as a tuned coupling circuit between tubes V1 and V2.

The tube V2 has two sections. The lower section forms a part of the local oscillator, and the tuned circuit at 28 tunes the local oscillator. The incoming amplified signal and the oscillator output are mixed in the upper half of the tube V2. The resulting intermediate frequency output is taken at the terminals 30 and is fed to an intermediate frequency amplifier, which usually, though not necessarily, operates at about 42 megacycles.

In the particular circuit shown, the tube V1 is a type 6GK5, and the tube V2 is a type 6BL8. Heater filaments are shown in the lower right at 25.

In a conventional television tuner the boxes 24, 26 and 28 would correspond to a three-wafer ganged rotary switch, with radio frequency coils carried between the contacts of the wafers. In the present case there are diodes which act as radio frequency switches, and the mechanical switching is used to appropriately bias the diodes. The circuitry in one of the boxes is shown in FIG. 2, with its terminals marked $x$ and $y$. These correspond to the leads marked $x$ and $y$ in FIG. 1 at the upper end of each of the boxes 24, 26 and 28.

The theory of the invention may be explained with reference to FIG. 3, in which it is assumed that a radio frequency signal is applied between the terminal 31 and ground. The tank capacitor is indicated at C$t$, and the coils are marked L2, L3, L4 and so on, up to L$n$. In a VHF television receiver there are twelve channels, usually marked 2 through 13, and in such case L$n$ in FIG. 3 would be L13.

The switching diodes are indicated at 2, 3, etc., on up to $n$. The diodes may be connected to ground by means of mechanical switches S2, S3, etc., on up to S$n$. They are also connected, through high resistors R2, to a line 32, which is connected to a reverse bias or blocking voltage source at terminal 34. Forward bias is applied at terminal 36. The negative side of both sources is assumed to be grounded. The resistors R2 are bypassed by bypass capacitors C2 for easy flow of radio frequency. These capacitors have a large value relative to the capacitance of the diode, and relative to the capacitance of the tank capacitor C$t$.

The inductors are connected in series, and the series is in parallel with the tank capacitor C$t$, thereby constituting the desired tank circuit. The diodes with reverse bias act as open circuits, and one diode which is forward biased acts as a bypass to ground. The forward bias is provided by closing a switch S, and all other diodes are reverse biased through resistors R2. The closing of any one of the switches causes its diode to act as a closed switch which bypasses the inductors to the left of the diode, while the inductors to the right are effective for tuning the tank circuit.

The other diodes receive blocking bias from terminal 34 through resistors R2, and they block the flow of radio frequency; that is, they are equivalent to open switches.

With all switches open the inductors are all in circuit, and the tuning is to the lowest frequency. As the switches S2, S3, etc. are closed successively, as by rotating a rotary switch, a forward bias is applied, and the reverse bias is eliminated, and the diode 2 or 3 etc., is made conductive. This is equivalent to short circuiting the inductors to the left of the closed switch, leaving in circuit those inductors to the right of the closed switch, until finally at the switch contact S*n* only the inductor L*n* is left in circuit. This corresponds to the highest frequency (or channel 13 in the case of VHF television).

The resistor 38 limits the forward bias current. The coil 40 is a radio frequency choke. The purpose of coil 40 and its bypass condenser 42 is to help isolate the tuned circuit from the bias supply, which otherwise might affect the tuning. In many cases the choke 40 is alone adequate, particularly if placed close to the junction of inductor L2 and diode 2.

With most silicon diodes the forward bias is more important than the reverse bias, the diode being nonconductive at zero bias, but use of both forward and reverse bias is preferable. In FIG. 3 it will be understood that the negative side of the forward bias source at terminal 36 and of the reverse bias source at terminal 34 both are grounded and are therefore connected together, and to all of the switches S. The reverse bias voltage is higher than the forward bias. Thus the closing of a switch completes the forward bias circuit, and at the same time shunts and thereby eliminates the reverse bias. Opening a switch S open-circuits and thereby eliminates the forward bias, and restores the reverse bias. The net reverse bias voltage is the difference between the voltage at terminal 34 and that at terminal 36.

The reverse bias source may be eliminated while retaining the forward bias source, and in such case the switch would serve the simple and direct purpose of either opening or closing the forward bias circuit, at the negative or grounded side of the source. This is possible if the radio frequency signal is less than about 0.025 volt.

Figure 3:
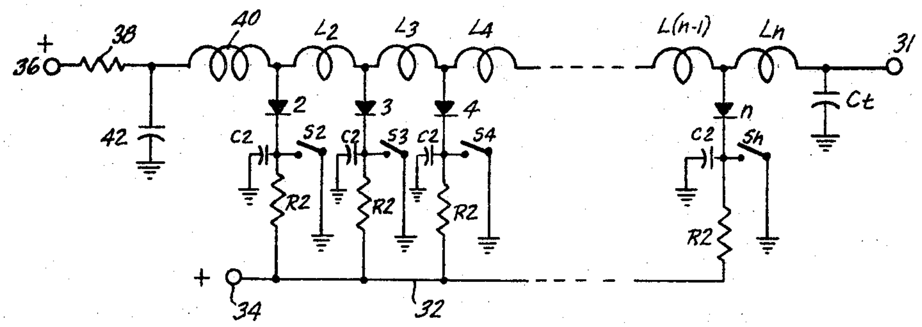
FIG. 3 is a diagram explanatory of the operation of the invention.

The circuit of FIG. 3 is essentially what is contained in each of the boxes 24, 26 and 28 of FIG. 1. As so far described there would be three rotary switches ganged together for rotation in unison, much as is now done, except that here it is only the bias that is being switched, rather than a radio frequency wave.

However, from examination of FIG. 3, it will be seen that the switches are all at ground potential. In a typical rotary switch it is the contact arm which would be put at ground potential, and thus the switch levers shown in FIG. 3 would be a single or common rotatable arm. With three ganged switches the arms would all be grounded, and indeed the three switches may be combined into a single switch, because the diodes are either grounded, or nonconductive, so that the three #2 diodes of the three tuned circuits may be connected together; the three #3 diodes of the three tuned circuits may be connected together; and so on. However, extra precautions should be taken to prevent undesired coupling between circuits, and as a practical matter it may be easier and less expensive to use a three gang switch than a single rotary switch.

The actual circuitry in the boxes of FIG. 1 is shown in FIG. 2, with the terminals *x* and *y* corresponding to the terminals *x* and *y* at bores 24, 26 and 28 in FIG. 1. Here again there are inductors, diodes, and switches for the different channels, but the parts have been rearranged, with the swicthes superposed instead of side by side in the diagram. It may be noted that although the diodes and their respective switches are numbered 2 through 13, the inductors are numbered 2 through 12, the reason for this being that in the particular tuner here shown the inductor L13 is outside the box. More specifically, in FIG. 1 the inductor 44 is L13 for box 24, the inductor 46 is L13 for box 26, and the inductor 48 is L13 for box 28.

The circuitry in FIG. 2 differs from FIG. 3 in several other minor respects. For example, in FIG. 2 one external terminal is not grounded, as it is in FIG. 3. Instead the terminals are *x* and *y*, neither of which is grounded. Also in FIG. 2 no specific tank capacitor C*t* is shown, the reason for this being that the circuit uses the capacitance of the associated vacuum tube and other stray capacitance as the tank capacitance.

In FIG. 2 a blocking bias of approximately 22½ volts is supplied by the source 50, and a forward bias of say 4½ volts is supplied by the source 52. The switches are not connected to ground, but they are connected to the negative side of both of the bias sources 50 and 52. The operation is therefore the same as previously described for FIG. 3, that is, the switch simply opens or closes the circuit to the forward bias source. It also shunts the reverse bias source, so that either one bias or the other is effective. The resistor 58 limits the forward bias current flow, and corresponds to the resistor 38 in FIG. 3. The resistors 60 correspond to the resistors R2 in FIG. 3. The bypass capacitors 62 correspond to the capacitors C2 in FIG. 3. The coils 54 and 56 are radio frequency chokes.

The operation is the same as previously described, that is, the closing of any switch connects its diode to the negative side of source 52 to apply forward bias. It also connects the diode to the negative side of source 50 and so shunts and eliminates the reverse bias. This causes its diode to become highly conductive, and to bypass the inductors up to that diode, leaving only the remaining inductors in circuit.

Figure 4:
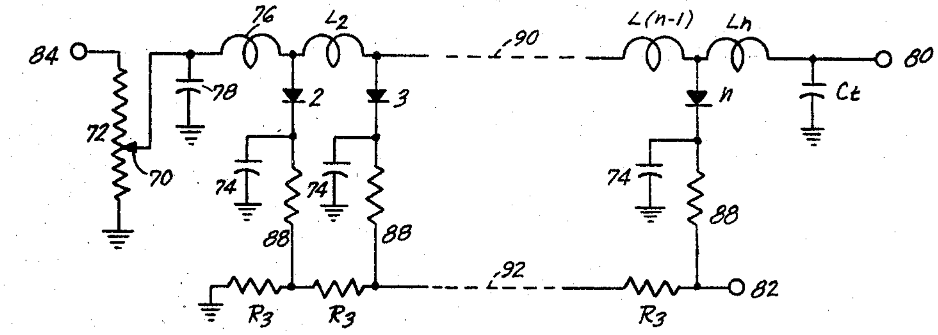
FIG. 4 shows a modification in which the selection is obtained by means of a continuously variable voltage.

FIG. 4 shows a modified form of the invention making use of a continuously variable bias, this being varied by movement of the contact 70 of a potentiometer 72. The inductors L2 through L*n* and the diodes 2 through *n* correspond to those in FIG. 3. The bypass capacitors 74 correspond to the capacitors C2 in FIG. 3, and the choke 76 and bypass capacitor 78 correspond to the choke 40 and capacitor 42 in FIG. 3. The tank capacitance is again indicated at C*t*, and the input is applied between terminal 80 and ground. Blocking bias is supplied at terminal 82, and forward bias at terminal 84. The resistors R3 correspond generally to the resistors R2 in FIG. 3, but are here connected in series.

The resistors R3 are connected in series to provide a voltage divider which is tapped at different voltage values to the successive diodes, so that varying the forward bias at the potentiometer 72 makes effective a different number of diodes for forward flow. As the potential from potentiometer 72 increases, additional diodes, starting with diode 2 and increasing toward diode *n*, are made conductive. The inductors to the right of the last diode which is conductive, are the ones which are effective for tuning.

The resistors 88 are used in multiple, and their purpose differs from resistor 38 in FIG. 3, the latter controlling the forward bias current. In FIG. 4 the main purpose is to maintain a difference in potential between the series of inductors or top line 90, and the series of resistors R3 or the bottom line 92. Without the resistors 88 there would be an undesired effect in that the diodes, when forward conducting, would pull the voltage of line 90 down nearly to that of line 92, because the diodes when forward conducting have so little resistance that they are much like a short circuit. This of course would spoil the intended voltage change and control action of the potentimeter 72.

In overall operation the arrangement of FIG. 4 differs from FIG. 3 in that many diodes are simultaneously conductive, instead of only a single diode. All of the diodes up to the selected channel are forward biased, and therefore relatively high currents flow through the resistors R3. This results in higher power dissipation, because of the multiple current flow.

Figure 5:
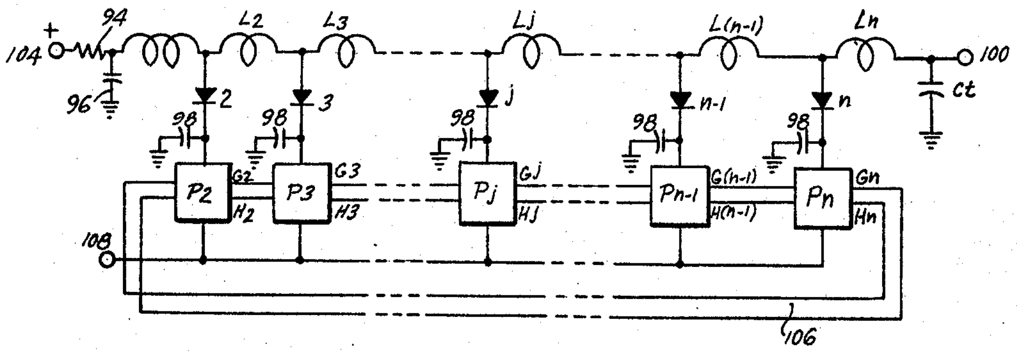
FIG. 5 shows a modification in which the control is wholly electronic.
Figure 6:
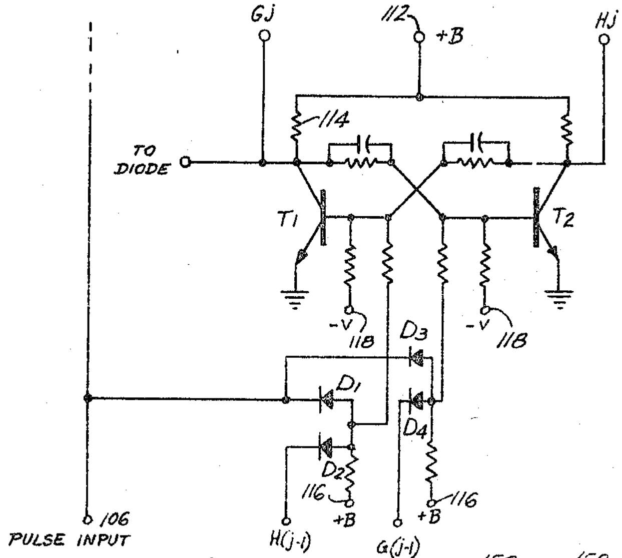
FIG. 6 shows the content of each of the boxes used in FIG. 5.

FIGS. 5 and 6 show the use of circuitry in which all switching is done electronically, there being no mechanical switching for the bias voltage. Because of complexity and cost, the arrangement is not suggested for use in home television receivers, but there are special situations, for example, where remotely controlled equipment is to be subjected to tremendous acceleration forces, in which a solenoid and ratchet arrangement may not function properly, and in such case the electronic switching arrangement has the advantage that it is well adapted for remote control, and would not be affected by acceleration forces.

Referring to FIG. 5, the inductors again are indicated at L2 through L*n*, connected in series, and cooperating with a tank capacitor C*t*. The current limiting resistor 94 and choke 95 and bypass capacitor 96 correspond to the parts 38, 40 and 42 in FIG. 3. The inductors again are controlled by diodes numbered 2 through *n*, and the radio frequency current flows to ground when a diode is conductive, through bypass capacitors 98 corresponding to capacitors C2 in FIG. 3.

In lieu of the switches S2 through S*n*, we have indicated boxes P2 through P*n*. These constitute a solid state commutation system. The external terminals again are terminal 100 and ground.

The assemblage of boxes P2 through P*n* comprise what is known as a "ring counter," widely used in logic circuits. The ring is closed by the conductors 106. In operation only one of the boxes is in an "on" state at a time. There is a pulse input at terminal 108, and each pulse shifts the "on" condition to the next box in the series.

The circuitry inside each box is illustrated in FIG. 6 of the drawing, the terminals G (*j*—*l*) and H (*j*—*l*) at the bottom corresponding to the input to a bias switch or box P*j*, and the terminals G*j* and H*j* at the top of the drawing corresponding to the output from bias switch or box P*j*. This is also shown in FIG. 5, in which there are dotted lines at each side of the box P*j* to indicate that it is a random box intermediate box P2 on one side and box P*n* on the other side.

The circuit shown in FIG. 6 is a bistate multivibrator circuit which is not free running, this being commonly called a "flip-flop" circuit.

The parts T1 and T2 are transistors in the flip-flop circuit. These are cross connected so that whenever one is in a blocking condition the other is in a conductive condition, and vice versa. In FIG. 5 it is assumed that the box P*j* is conductive for diode *j*, and in such case in FIG. 6, the transistor T1 is conductive to ground, and the transistor T2 is blocking. In the preceding box the transistors are in opposite state; that is T1 is blocking and T2 is conducting. This means that there is a high potential at the terminal G (*j*—*l*) and almost no potential at the terminal H (*j*—*l*).

Since the terminal H (*j*—*l*) is essentially at ground potential, diode D2 is maintained in a conducting state, thus preventing the "and" gate formed by diodes D1 and D2 from passing any pulse signals at terminal 106 to the base of transistor T1. On the other hand, terminal G (*j*—*l*) is at a high potential. Therefore a positive pulse signal at terminal 106 will pass through the "and" gate formed by diodes D3 and D4 to the base of transistor T2. This pulse at the base of transistor T2 will drive that transistor into conduction and cause the flip-flop circuit to change state.

Prior to the pulse that caused P*j* to change state, transistor T1 was conducting and T2 was blocking. Therefore, terminal G*j* was essentially at ground potential and terminal H*j* was a a high potential. Therefore, box P (*j*+*l*) (not shown) reacts in exactly the opposite way to box P*j* when an input pulse is received at terminal 106. Box P (*j*+*l*) changes state from "off" to "on" when box P*j* changes from "on" to "off." All other boxes will remain "off."

The circuit is well adapted for remote control, and the remote control is obtained by a pulse input which is applied at the terminal 106. Each pulse shifts the tuning one step or channel. The next pulse will transfer the "on" state from box P (*j*+*l*) to the next box, effectively closing the next diode switch and effectively opening the diode *j*+*l*. This continues, pulse by pulse, until finally, after reaching box P*n*, the "on" state is next shifted to box P2.

In FIG. 5 the forward bias is applied at terminal 104. No special terminal is shown for the reverse bias because the regular plus B voltage of the flip-flop circuit is used for reverse bias. Thus, in FIG. 6 the plus B terminal 112 supplies reverse bias through resistor 114, which for the present purpose corresponds to the resistors R2 in FIG. 3. The terminals 116 may be connected to terminal 112, that is, all may be a common terminal. The terminals 118 are for the usual negative bias used on the transistors T1 and T2.

It is already known to print a spiral coil on an insulating substrate, and also to provide a resistor by depositing a very thin line, usually in zig zag form for increased path length. It is also known to provide a capacitor by depositing a first metal film, then an insulating film, and then a second conducting film, and sometimes the insulating film is provided by oxidizing the metal film itself, as when using aluminum. In addition, exceedingly tiny diodes have already been developed, sometimes called "microdiodes." These have very fine leads which can be bonded to the deposited metal of the other thin film components on the substrate. Bridging may be provided by raising the leads somewhat. The ends may be bonded by thermcompression bonding.

Figure 7:
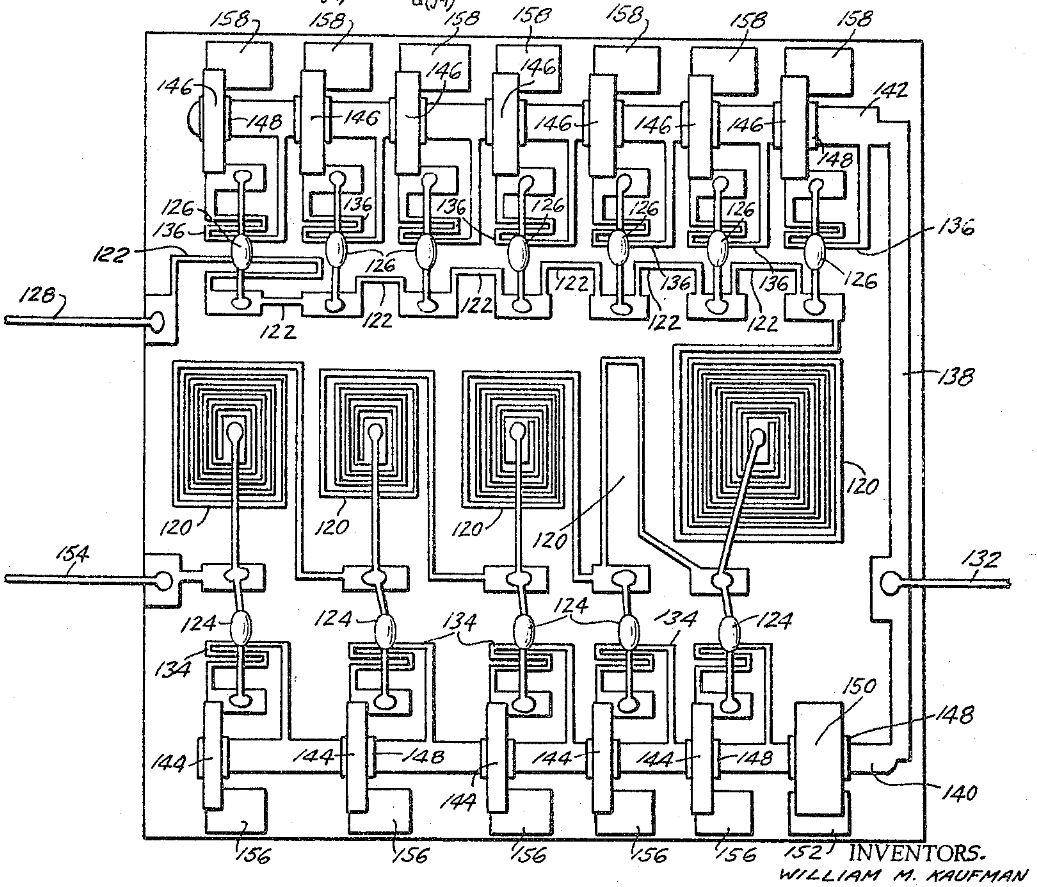
FIG. 7 shows an embodiment using "thin film" circuitry.

With these techniques available, the components of a circuit such as that shown in FIG. 3 may be provided in highly compact or miniaturized form, as illustrated in FIG. 7, in which the scale is enlarged about three times. However, the module of FIG. 7 is largely but not wholly a true VHF television tuner for present channels, because a few coils are out of sequence and size.

Referring to FIG. 7, the printed coils are indicated in two horizontal rows, the lower row having five coils marked 120, and the upper row having six coils marked 122. The upper coils require very little inductance, most being U shaped, and one, at the left, being a simple straight line. There are eleven coils for twelve channels, by analogy to FIGS. 1 and 2 of the drawing, in which one coil is in the circuitry outside the box.

The diodes are microdiodes the leads of which bridge somewhat above the printed circuitry. There are five diodes marked 124 in the lower half, and seven diodes marked 126 in the upper half of the substrate. The positive side of the forward bias source is connected at 154, this being analogous to the connection 36 in FIG. 3. However, a choke in series with the forward bias source, this being analogous to the choke 40 in FIG. 3, has not been included in this figure. A choke is not necessary since the diode at the left of the lower line bypasses the power supply when all the coils are being used in series.

The positive side of the reverse bias source is connected to terminal 132, this being analogous to the terminal 34 in FIG. 3, and to the right side of the battery 50 in FIG. 2.

There are resistors in series with the reverse bias source, and these are shown at 134 on the lower half of the substrate, and at 136 on the upper half. The connection is from terminal 132 to the vertical printed line 138, to the horizontal printed lines 140 and 142, and then through short vertical printed lines to the resistors. These resistors are analogous to the resistors R2 in FIG. 3, and to the resistors 60 in FIG. 2.

The bypass capacitors for radio frequency are indicated at 144 on the lower half of the board, and at 146 on the upper half of the board. The horizontal printed lines 140 and 142 act as the lower plates of the capacitors. Then an insulating film is applied, indicated at 148, following which the vertical lines act as the upper capacitor plates. The capacitor at 150 is a coupling capacitor, and the terminal or contact area at 152 may be used as one input terminal of a two wire input. The other input terminal is the upper wire lead 128 at the left. The said terminal 128 corresponds generally to the terminal 31 in FIG. 3.

The manually operable switch is external to the thin-film circuit shown, and the terminals 156 along the bottom edge, and the terminals 158 along the top edge, receive wire leads (not shown) extending to the contacts of a rotary switch. The rotatable contact or rotor of the switch is connected to the common negative side of the forward and reverse bias sources. This is in analogy to the vertical line at the left of FIG. 2, which is common to the switches. In some circuits this may happen also and incidentally to be a ground connection, as in the circuit shown in FIG. 3, in which case the switch rotor is connected to ground.

It will be understood that there would be three such boards or modules, corresponding to the three boxes in FIG. 1, and three ganged switches, one for each module.

Miniaturization is made possible by this thin film technique. The printed circuitry here illustrated is only two inches square. By appropriate rearrangement the terminal areas 156 and 158 could be made the switch terminals, for cooperation with a movable switch element.

Some quantitative values may be given by way of example, but these are not intended to be in limitation of the invention. The diodes so far used in FIG. 2 or FIG. 3 are glass sealed silicon alloy junction diodes. The forward bias is 4.5 volts and the reverse bias is 22.5 volts. The current carrying capacity is not important for the present purpose, but these happen to have a capacity of 100 milliamperes. The diodes have a capacitance of say one mmf. or pf. at zero bias and one half pf. at high reverse bias. The forward conductance must be high, and is variable with the bias. Because the characteristic curve of these diodes is very steep in its forward section, it is usual to specify forward bias in terms of current instead of voltage. In the present case the reverse bias voltage is 22.5 volts and the forward bias current is 60 milliamperes. The latter bias produces a forward resistance of only 1.3 ohms. The blocking resistance under reverse bias is very high, it being greater than $10^7$ ohms.

In general the requirements are that the resistance be very low in forward direction and very high in reverse direction, and that the capacitance be low in both directions.

The inductors L2 through L13 may correspond to those used at present with mechanical switching. They may range from say 0.3 microhenry for L2, to 0.01 microhenry for L13.

The bypass capacitors C2 in FIG. 3 (or 62 in FIG. 2), may have a value of 500 or 750 pf. The inductor 40 is a choke having a value of say 10 microhenries. The resistor 38 is a current limiting resistor having a value of, say 56 ohms to produce a forward bias of, say 60 milliamperes. This allows for a voltage drop in the diode itself, which may be a matter of say ¾ of a volt to reach the knee of the characteristic curve. In any event the relation of forward bias voltage to the resistance at 38 is selected to put the diode well into its forward conduction region.

The resistors R2 in FIG. 3 (or the resistors 60 in FIG. 2), may have any high value, starting at say 10,000 ohms, and typically may be one megohm. They can have a very high resistance because good diodes pass only microamperes or less when reverse biased.

The tank capacitor $C_t$ in FIG. 3 has a value of about 10 mmf.

In FIG. 4 the inductors and capacitors may have similar values. The choice of resistors depends on the designers choice of voltages, and also on the forward voltage drop of the diodes.

It is believed that our improved circuitry for electronic switching of tuned circuits, as well as the operation and the advantages of the same, will be apparent from the foregoing detailed description. When mechanical switching contacts are used they are not in the radio frequency circuit, and consequently there is no contact noise and no problem of contact barrier at the switch contacts. Such barrier is insignificant for the substantial D.C. bias voltage, but may be very harmful with a weak signal which may be of the order of millivolts or microvolts. With the arrangement of FIG. 5 no mechanical motion is needed, and instead even the bias switching is obtained by using a solid state commutation circuit. This is particularly well suited for remote control because no motor drives are needed, and is especially valuable for apparatus which may be subjected to high acceleration forces. The circuitry required is well suited to the use of thin film components deposited on a substrate, which in turn is adapted for high production output and good reproducibility.

It will be understood that while we have shown and described our invention in several preferred forms, changes may be made without departing from the scope of the invention, as sought to be defined in the following claims. In the claims the mention of a tank capacitor is not intended to exclude the use of the capacitance of a tube or other distributed or stray capacitance, as explained above in connection with FIGS. 2 and 7.

We claim:

1. A tuner for a television receiver for tuning to one of a number of discrete fixed television channel frequencies, said tuner having a plurality of tuned circuits, said circuits comprising a tank capacitor, a plurality of series-connected inductors for cooperation with said capacitor, and a plurality of diodes acting as selectively usable switches connected to points between said inductors for bypassing a desired number of said inductors, a source of forward bias, one side of each diode being connected to one side of the forward bias source through the series-connected inductors, said diodes being normally connected to one side of a reverse bias source through resistors which have a resistance value high enough to block the radio frequency, the other side of both of said bias sources being grounded, the side of each diode remote from the inductors being connected via a large by-pass capacitor to ground for radio frequency flow to ground when the diode is made conductive, and the said remote side of each diode also being connected to ground by means of a normally open bias switch which when closed applies the forward bias to and effectively overcomes the reverse bias on the corresponding one of said diodes and thereby makes the said diode conductive for radio frequency which then flows through the corresponding one of the said by-pass capacitors, cooperative resonance being thereby established between the tank capacitor and one or more of the series-connected inductors, the resonant radio-frequency current flowing from ground, through the tank capacitor, through the said one or more inductors, through the corresponding by-pass capactor, and back to ground.

2. A tuner for a television receiver as defined in claim 1 in which the bias switches are part of a solid state commutation circuit which is controlled by means of remotely applied signals.

3. A tuner for a television receiver as defined in claim 2 in which the commutation circuit is a ring counter using flip-flop circuits as gates with only one gate in an "on" condition to make its corresponding diode conductive.

4. A tuner for a television receiver as defined in claim 1, in which the tuned circuits have like numbers of diodes, and in which each tuned circuit has a rotary switch with as many contacts as there are diodes, each rotary switch providing the said normally open bias switches only one of which is closed at any one time, and a single control means, the said rotary switches being ganged for simultaneous movement by said single control means.

5. A tuner for a television receiver as defined in claim 4, in which the inductors and resistors are formed by thin film techniques on an insulating substrate, and in which the diodes are microdiodes the leads of which are bonded to appropriate parts of the thin film coils and resistors, whereby the tuned circuits are miniaturized modules except for the said ganged switch which controls the bias applied to the diodes.

References Cited by the Examiner

UNITED STATES PATENTS

| | | | |
|---|---|---|---|
| 2,609,492 | 9/1952 | Loughlin | 325—462 |
| 2,923,891 | 2/1960 | Nicholson | 333—29 |
| 2,993,991 | 7/1961 | Lundahl | 325—392 |
| 3,018,372 | 1/1962 | Valdettaro et al. | 325—458 X |
| 3,020,421 | 2/1962 | Craiglow | 307—88.5–1 |
| 3,100,245 | 8/1963 | Feldman | 179—90.3 |
| 3,155,922 | 11/1964 | Hackett | 331—179 |

FOREIGN PATENTS

| | | |
|---|---|---|
| 1,091,627 | 10/1960 | Germany. |

OTHER REFERENCES

Terman, F. E., Radio Engineering, McGraw-Hill, 1947, TK655T4, pp. 353–354.

Langford, Robert: "Three approaches to Microminiaturization," Electronics, Dec. 11, 1959, TK7800.E58, pp. 49–52.

DAVID G. REDINBAUGH, *Primary Examiner.*

E. C. MULCAHY, B. V. SAFOUREK, *Assistant Examiners.*